United States Patent [19]

Faugeras et al.

[11] 4,299,798
[45] Nov. 10, 1981

[54] APPARATUS FOR THE TREATMENT OF SOLIDS BY LIQUIDS

[75] Inventors: Pierre Faugeras, Pont Saint-Esprit; Pierre Fremeaux, Meyzieu; Edouard Henry, Pont Saint-Esprit; Roger Malaterre, Bourg Saint-Andeol; Pierre Ros, Sauveterre, all of France

[73] Assignee: Commissariat a l'Energie Atomique, Paris, France

[21] Appl. No.: 112,389

[22] Filed: Jan. 16, 1980

[30] Foreign Application Priority Data

Dec. 19, 1978 [FR] France ............................. 78 36388

[51] Int. Cl.³ ............................................. B01D 11/02
[52] U.S. Cl. .................................................. 422/281
[58] Field of Search ............. 422/281, 261; 23/293 R; 134/111

[56] References Cited

U.S. PATENT DOCUMENTS

| | | | |
|---|---|---|---|
| 2,783,189 | 2/1957 | Bergstrom et al. | 422/281 X |
| 2,932,559 | 4/1960 | Placek | 422/273 |
| 3,148,069 | 9/1964 | Sjogren et al. | 422/261 |
| 4,040,793 | 8/1977 | Achsel et al. | 422/259 |

FOREIGN PATENT DOCUMENTS 2035205 12/1970 France .
2330428 6/1977 France .
363639 9/1962 Switzerland .

Primary Examiner—William A. Cuchlinski, Jr.
Attorney, Agent, or Firm—Dowell & Dowell

[57] ABSTRACT

In an apparatus including a column through which the liquid and the divided solids to be treated thereby circulate in counter-current, the treated solids which tend to collect at one of the column being conveyed hydraulically by a fraction of the liquid introduced into the column towards separating means from which the said fraction is re-cycled into the column, the circuit of the liquid intended to circulate through the column and the circuit of the liquid intended to convey the treated solids are wholly separated from each other, the first one comprising a first inlet nozzle directed towards the other end of the column and the second one a second inlet nozzle directed towards the inlet of the conduit through which the treated solids are hydraulically conveyed, this second nozzle being located between the first one and the adjacent end of the column. In the case of solids heavier than the treating liquid, both inlet nozzles are disposed axially in a chamber provided at the lower end of the column.

4 Claims, 2 Drawing Figures

APPARATUS FOR THE TREATMENT OF SOLIDS BY LIQUIDS

The present invention relates to apparatus for the continuous treatment of divided solids by liquids, as for instance for the extraction of oil from oil seeds by means of a solvent.

It is known that when the density of the solids is substantially different from that of the liquid, such a treatment may be effected by means of columns, and more particularly of pulsated columns, in which the solids and the liquid circulate in counter-current. These columns in fact ensure an intimate and durable contact between the liquid and the solids, but the removal of the treated solids from their lower or upper end (according as they are of heavier or lighter density than the liquid) has not yet been satisfactorily solved in actual practice.

It has been proposed to convey the treated solids hydraulically by means of a fraction of the liquid introduced into the column. Assuming the solids are of heavier density than the liquid, as this is generally the case, the solids are introduced into the upper end of the column and the liquid into the lower end thereof. The solids fall by gravity in counter-current to the rising liquid and they thus reach an appropriate space provided at the lower end of the column, from which they are entrained by a fraction of the incoming liquid. They are thus hydraulically conveyed towards an appropriate separating apparatus from which they are withdrawn in the conventional manner, the liquid being returned to the lower end of the column. Theoritically speaking, the operation of the column is thus quite unaffected by the removal of the treated solids and the separation of these latter from the liquid may be effected under the most favourable conditions.

But a difficulty is that this hydraulic conveying of the treated solids requires the injection of a much higher flow of fresh liquid into the column. This liquid whirls up and down within the space or chamber provided for the collection of the treated solids which are thus in part maintained in suspension or even entrained into the adjacent portion of the column. This impairs the efficiency of the latter.

The present invention has for its object to avoid this drawback.

According to the invention, in an apparatus for the treatment of divided solids by a liquid, of the kind comprising a column through which the solids and the liquid circulate in counter-current under the action of their different densities, the solids being collected in a space provided at a first end of the column and being hydraulically conveyed from the said space towards separating means through a conveying conduit which opens in the said space, by a fraction of the liquid introduced thereinto, there is provided for the introduction of the liquid into the said space a first nozzle directed towards the opening of the said conduit and through which the liquid for the entrainment of the solids is injected, and a second nozzle directed towards the second end of the said column for the liquid which will circulate through the column in counter-current to the solids introduced into the said second end of the said column.

In accordance with another feature of the invention, when the conduit through which the solids are hydraulically conveyed opens axially at said first end of the column, the said first and second nozzles are preferably directed axially in opposition to each other, the first one being situated between the second one and the adjacent end of the column.

The apparatus conveniently comprises a treating circuit for the liquid which circulates through the column in counter-current to the solids and a conveying circuit for the liquid which entrains the solids from the said collecting space towards the separating means, each circuit comprising at least one pump and being substantially independent of the other.

Figure 1:
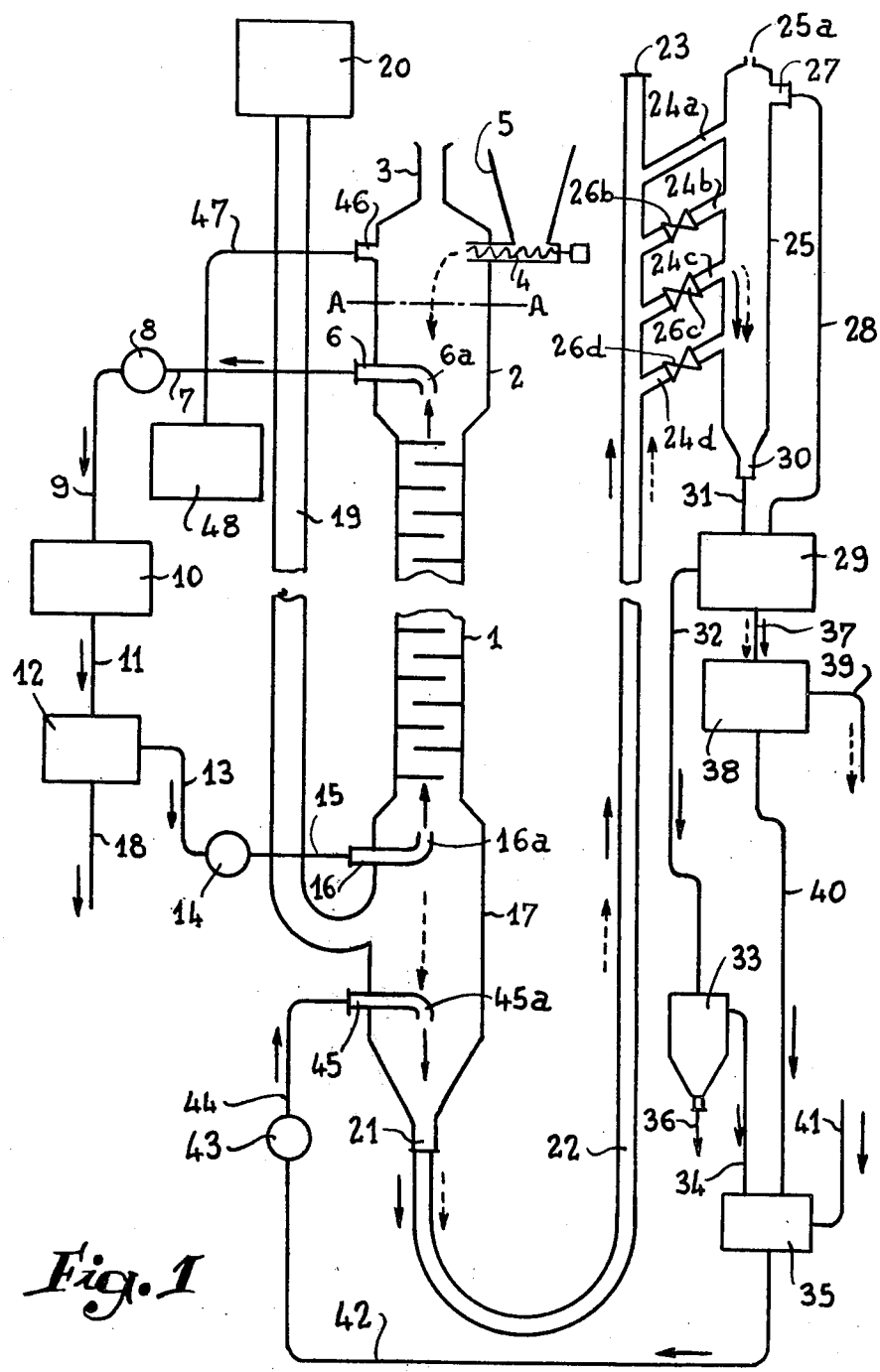
FIG. 1 illustrates very diagrammatically an apparatus according to the invention for the treatment of relatively heavy divided solids by a solvent of lower density.

The column 1 illustrated in FIG. 1 is of the kind comprising superposed baffle plates, but its inner arrangement could be different if desired. Column 1 is a formed with an upper chamber 2 which communicates with the outer atmosphere through a chimney 3. The divided solids to be treated (as for instance oil seeds) are introduced into the upper portion of this chamber by means of a screw conveyor 4 from a hopper 5, while a pipe 6 opens in the lower portion of the said chamber as an outlet for the solvent (as for instance hexane) containing the substances (oil, for instance) extracted from the solids. This pipe 6 has preferably a downwardly directed inlet end as illustrated at 6a and it is connected by a conduit 7 with the suction side of a pump 8. The outlet of this pump is in turn connected by a conduit 9 with a regulating tank 10. The latter is connected by a conduit 11 with a distilling apparatus 12 in which the solvent and the substance extracted from the solids are separated in the conventional manner. The distilled solvent flows through a conduit 13 towards a pump 14, the outlet of which is connected by a conduit 15 with a nozzle 16 disposed within a chamber 17 provided at the lower end of the column, below the baffle plates thereof. As illustrated this nozzle 16 has an upwardly directed outlet end 16a which opens substantially axially with respect to the column. The distilling apparatus 12 has a second outlet 18 for the substance extracted (oil) from the solvent.

The lower chamber 17 is furthermore laterally connected by a pipe 19 of large cross-section with a pulsating apparatus 20 of any conventional construction by means of which pulsations are imparted to the liquid which circulates through the column to improve the contact between the liquid and the solid phases.

The bottom of the lower chamber 17 is funnel-shaped and comprises an axial outlet 21 which is connected with a syphon conduit 22. This conduit, of relatively large cross-section in order to minimize head losses, is bent at 180° and rises vertically above the upper chamber 2, its end being closed as indicated at 23. In the portion of the said conduit situated above the level of the bottom of chamber 2 there is provided a succession of four lateral branches 24a, 24b, 24c and 24d which rise obliquely and open into the same vertical tubular body 25. The upper branch 24a extends freely between the conduit 22 and the vertical body 25, while the other three have each a controlling valve respectively 26b, 26c, 26d.

The upper end of the tubular body 25 communicates with the outer atmosphere through an orifice 25a. Somewhat below this orifice, but still above the upper lateral branch 24a, body 25 has an upper or overflow outlet 27 which is connected by a conduit 28 with a first inlet of a separator 29, the role of which will be more fully explained below. The lower end of body 25 has a second outlet 30 which is also connected with separator 29 by a conduit 31. Separator 29 has a first or solvent outlet which is connected by a conduit 31. Separator 29 has a first or solvent outlet which is connected by a conduit 32 with a decanter 33. The solvent outlet of this latter is connected by a conduit 34 with a solvent collecting tank 35, while another outlet 36 permits of discharging from decanter 33 the residual solids entrained by the solvent through conduit 32. The second or solid outlet of separator 29 is connected by a conduit 37 with a heated drier 38 from which the dried and more or less baked solids (seeds) are discharged through an outlet 39, while the reclaimed and condensed solvent flows through a conduit 40 towards the collecting tank 35. This tank has a third inlet 41 adapted to receive the quantity of solvent required for the compensation of losses.

A conduit 42 connects the lower portion of tank 35 with the inlet of a pump 43 the outlet of which is connected by a conduit 44 with a nozzle 45 disposed within the lower portion of the lower chamber 17, below the above described nozzle 16, this nozzle 45 having a downwardly directed end 45a which opens axially above the lower outlet 21 of column 1.

The upper chamber 2 has an overflow outlet 46 which is connected by a conduit 47 with a safety tank 48.

The apparatus described operates as follows:

The column 1 is filled with solvent, as for instance hexane, up to the level A—A situated within the upper chamber 2 between the pipe 6 and the overflow outlet 46. The conveyor 4 introduces into the said chamber the solids to be treated, as for instance oil seeds. Owing to their relatively high density these solids sink progressively through the solvent which circulates upwardly within the column, the latter being pulsated by the pulsating apparatus 20 through the connecting pipe 19. The treated solids are collected in the lower chamber 17 while the enriched solvent which leaves the column through pipe 6 and conduit 7, is directed by pump 8 and conduit 9 towards the regulating tank 10 and the distilling apparatus 12, the extracted substance (oil) being discharged through conduit 13. The distilled solvent is recycled by pump 14 through the upwardly directed nozzle 16.

But another stream of solvent is introduced into the lower chamber 17 through the downwardly directed nozzle 45 by pump 43 and conduit 44. This solvent flows through the syphon conduit 22 and it entrains the solids which tend to collect in the funnel-shaped lower portion of chamber 17. This flow of liquid and solids passes through the first lateral branch 24d to 24a which is open starting from the lower one, as for instance through branch 24c. The mixture thus reaches the vertical body 25 from which it flows downwardly into separator 29 (conduit 28 being only provided as a matter of safety). In this separator (which may be of the vibrating screen type) the solvent is separated from the solids and it flows into the decanter 33 in which the residual particles are eliminated. It finally reaches the solvent collecting tank 35 from which it is recycled by pump 43. The separated solids are transferred by conduit 37 from separator 29 into drier 38 from which they are discharged through outlet 39, while the reclaimed solvent is directly directed towards the collecting tank 35 through conduit 40.

The position of level A—A within the upper chamber 2 is determined by the level at which the lowermost open lateral branch 24d to 24a opens into vertical body 28.

In FIG. 1 the arrows in full line indicate the flow of solvent (pure or charged with oil), while those in dash line correspond to the solids.

It is clear that the apparatus described comprises two solvent circuits. The first one, which may be termed the extracting circuit, includes, starting from the regulating tank 10, distilling apparatus 12, pump 14, nozzle 16, column 1, pipe 6 and pump 8. If the flow rates of pumps 14 and 8 are appropriately adjusted with respect to each other, this circuit has no influence whatever on the position of level A—A.

The second solvent circuit, or solid conveying circuit, comprises, starting from collecting tank 35, pump 43, nozzle 45, syphon conduit 22, vertical body 25, separator 29 and decanter 36, with drier 3 which may be considered here as in parallel to decanter 33. Here again if the unavoidable slight losses of solvent are correctly compensated by a small supply of fresh solvent through inlet 41, this circuit has no influence on level A—A.

Owing to the fact that nozzles 16 and 45 are directed in opposed directions, under normal operating conditions the extracting circuit and the conveying circuit are therefore wholly separated from each other, which means there is practically no passage of solvent from one circuit to the other (apart from the quite small quantity of fresh solvent which passes from the conveying circuit to the extracting circuit to compensate the losses in the latter). The treated solids may thus fall regularly through the lower chamber 17 without any risk of being entrained by the solvent issuing from nozzle 16. The formation of eddies within the said chamber is thus eliminated and the column may operate as efficiently as if no hydraulic discharge of the treated solids were provided.

It will be observed that the apparatus of FIG. 1 may easily be arranged to operate under a pressure lower or higher than the outer atmospheric pressure. It would be sufficient to connect chimney 3 and orifice 25a with an appropriate source of pressure or underpressure.

Figure 2:
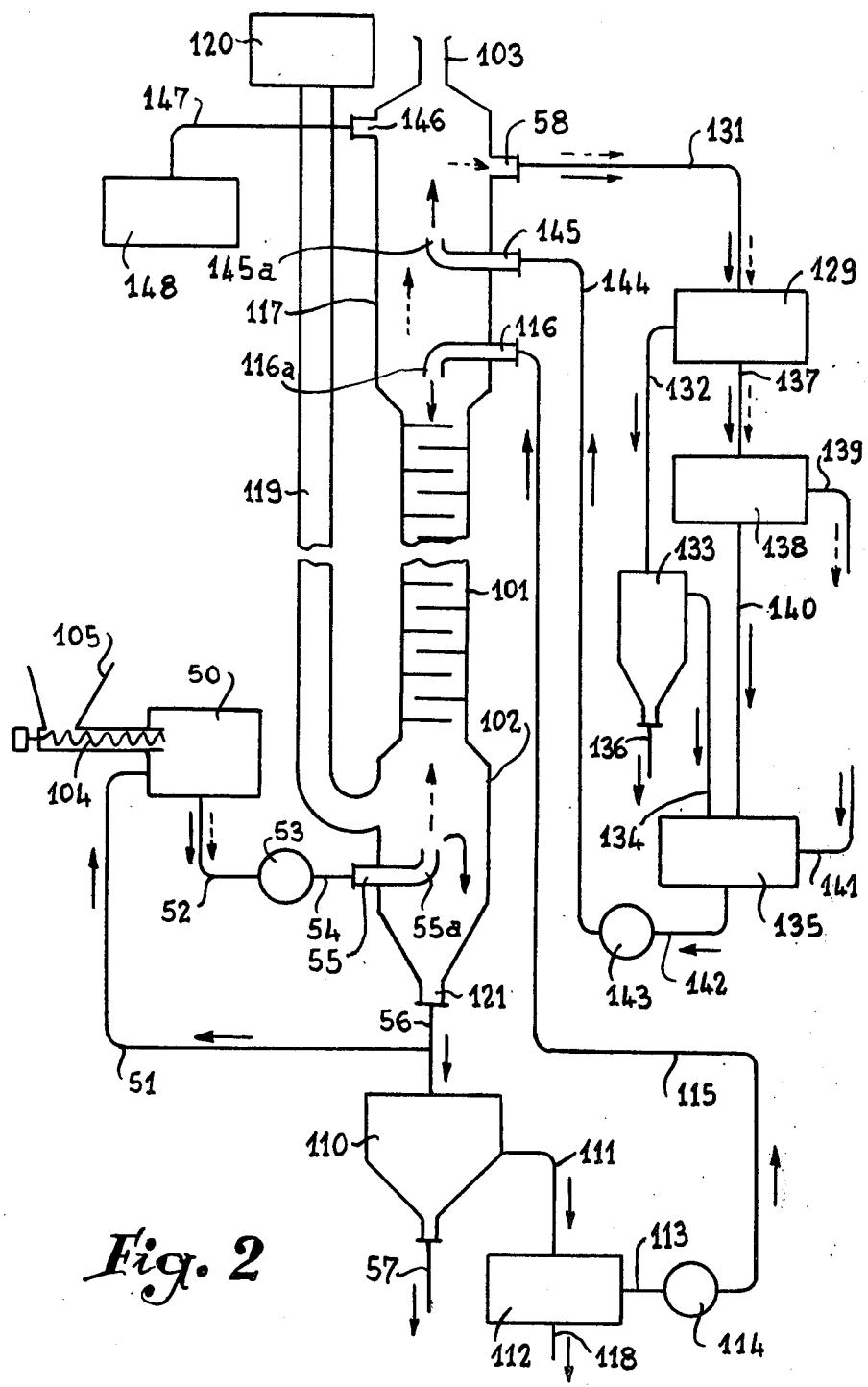
FIG. 2 illustrates in the same manner an apparatus for the treatment of relatively light divided solids by a solvent of higher density.

The embodiment oF FIG. 2 corresponds to the case wherein the solids to be treated are lighter than the treating solvent. These solids may be light oil seeds, the solvent being for instance trifluoro-trichloroethane. The main elements are here the same as in the case of FIG. 1 and they have been referenced with the same numerals plus 100.

The hopper 105 and the screw conveyor 104 introduce the solids into a fluidizer 50 within which they are dispersed by an appropriate stirrer in solvent derived from the lower outlet 121 of the column 101 through a branch conduit 51. The mixture or suspension issuing from fluidizer 50 is directed by a conduit 52 towards a pump 53 which injects it upwardly into the lower chamber here referenced 102, since it forms the inlet chamber for the solids and the outlet chamber for the solvent, as chamber 2 of FIG. 1. This injection is effected by means of a conduit 54 and of a nozzle 55 having an axial upwardly directed outlet 55a.

It should be noted that if the screw conveyor is realized under liquid-tight form, pump 53 may be inserted in conduit 51 and may thus only receive pure solvent.

A discharge solvent conduit 56 is also connected with the axial outlet 121 of column 101. This conduit opens into the regulating tank 110 which forms at the same time a decanting apparatus for the heavy impurities which the solids to be treated may contain and which may be discharged through a conduit 57. Tank 110 is connected by conduit 111 with the distilling apparatus 112. This latter has a first outlet 118 for the extracted substance (oil) and a second outlet (conduit 113) for the distilled solvent which pump 114 forces through conduit 115 towards the solvent inlet nozzle 116 disposed within the solid collecting chamber 117 (which is here the upper chamber) the outlet 116a of this nozzle being here directed downwardly.

The inlet nozzle 145 of the solid conveying circuit is disposed above nozzle 116 within chamber 117, its axial outlet end 145a being directed upwardly. The said chamber 117 has an outlet 58 which is connected by conduit 131 with separator 129. The apparatus again comprises decanter 133, drier 138 and collecting tank 135 from which the solvent is recycled by pump 143 towards nozzle 145.

In the apparatus of FIG. 2 the solids are fluidized in fluidizer 50 and introduced into the lower chamber of the column from which they rise towards the upper chamber through the solvent which circulates downwardly through the column. The treated solids tend to collect in the upper portion of chamber 117 from which they are entrained by the solvent of the conveying circuit. Here again, owing to the arrangement of the nozzles 145 and 116 within chamber 117, if the pumps are correctly adjusted, the extracting circuit and the conveying circuit are wholly separated from each other and no eddies are formed in the solid collecting chamber 117.

It is to be noted that in FIG. 2 there is a third solvent circuit, which was not to be found in FIG. 1, namely the circuit formed of conduit 51, fluidizer 50, pump 53 and (in part) outlet 121. But concerning the solvent, this circuit is a mere derivation of the extracting circuit. Considering the mass of solvent which flows through outlet 121, a portion is derived through conduit 51, charged with solids in fluidizer 50 and returned to chamber 102, without affecting the rate of flow in the remainder of the said extracting circuit proper. Furthermore the divided solids could be directly introduced into chamber 102, as for instance by a liquid-tight screw conveyor, the fluidizing circuit being thus dispensed with.

It will be noted that the embodiment of FIG. 2 no more comprises the syphon conduit 22 of FIG. 1 with the lateral branches 24a-24d and the vertical body 25. The level within the upper chamber 117 is therefore only maintained by introducing through conduit 141 the quantity of solvent required to compensate the losses in operation.

While the invention has been described with reference to the treatment of solids by a solvent, it should be understood that the liquid may act on the divided solids otherwise than by dissolving a substance which they contain. This liquid could be a chemical agent adapted to react with a least a component of the solids. More generally speaking the apparatus described may be used whenever it is desired to realize an intimate contact between a liquid and a divided solid, the term "treatment" used in the present specification and claims including any form of interaction.

What we claim is:
1. In an apparatus for the continuous treatment of divided solids by a liquid, of the kind comprising:
   a column through which said divided solids and said liquid circulate in counter-current under the effect of their different densities, said column having a first end and a second end and being formed with a first space at said first end and with a second space at said second end,
   means to introduce said liquid into said first space;
   means to introduce said divided solids into said second space;
   means to discharge said liquid from said second space;
   a coveying conduit through which the treated solids which collect in said first space are hydraulically conveyed by the liquid introduced into said first space;
   and means to receive the hydraulically conveyed solids, to separate the liquid therefrom and to recycle the separated liquid; the improvement according to which:
said means to introduce said liquid into said first space comprise:
   a first nozzle disposed within said first space and directed towards said second end of said column;
   means to force through said nozzle a first fraction of said liquid to cause said first fraction to circulate through said column;
   a second nozzle disposed within said first space between said first nozzle and said first end of said column;
   and means to force through said second nozzle a second fraction of said liquid to cause said second fraction to entrain said treated solids through said conveying conduit;
said conveying conduit opening in said first space beyond said second nozzle with respect to said first nozzle.

2. In an apparatus as claimed in claim 1, said first and said second nozzles being directed in substantially opposite directions.

3. In an apparatus as claimed in claim 2, said first nozzle and said second nozzle being disposed substantially axially within said space.

4. In an apparatus as claimed in claim 1, an extracting circuit with at least one pump for said first fraction of said liquid and a conveying circuit with at least one pump for said second fraction of said liquid, with said extracting circuit and said conveying circuit being substantially independent from each other.

* * * * *